Jan. 19, 1943.  J. W. WHITE  2,308,846
STEERING MECHANISM
Filed Sept. 11, 1940  4 Sheets-Sheet 1

INVENTOR
JOHN W. WHITE
BY
ATTORNEY

INVENTOR.
JOHN W. WHITE
BY
ATTORNEY.

Jan. 19, 1943.　　　J. W. WHITE　　　2,308,846
STEERING MECHANISM
Filed Sept. 11, 1940　　　4 Sheets-Sheet 3
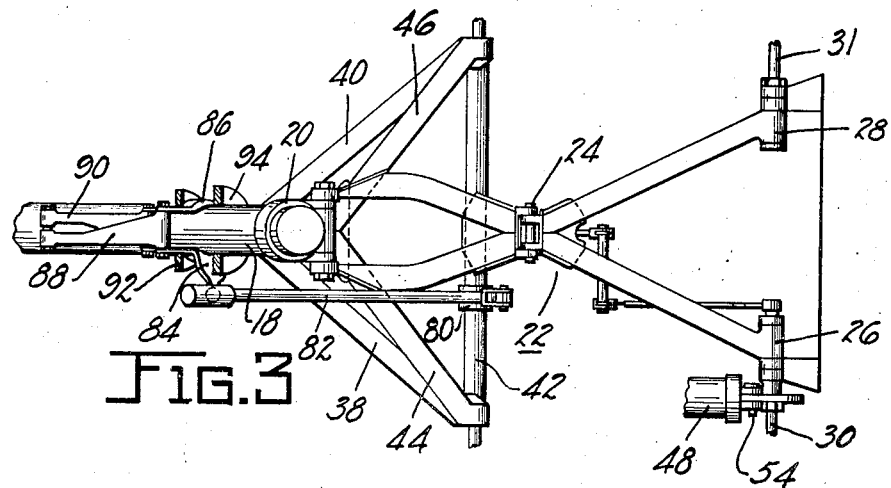
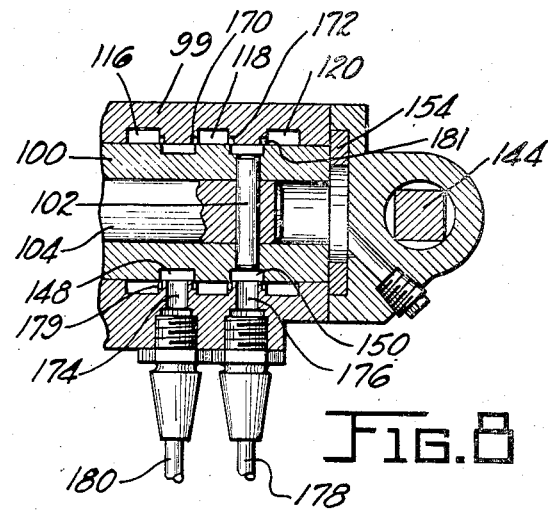
INVENTOR.
JOHN W. WHITE
BY
H. O. Clayton
ATTORNEY.

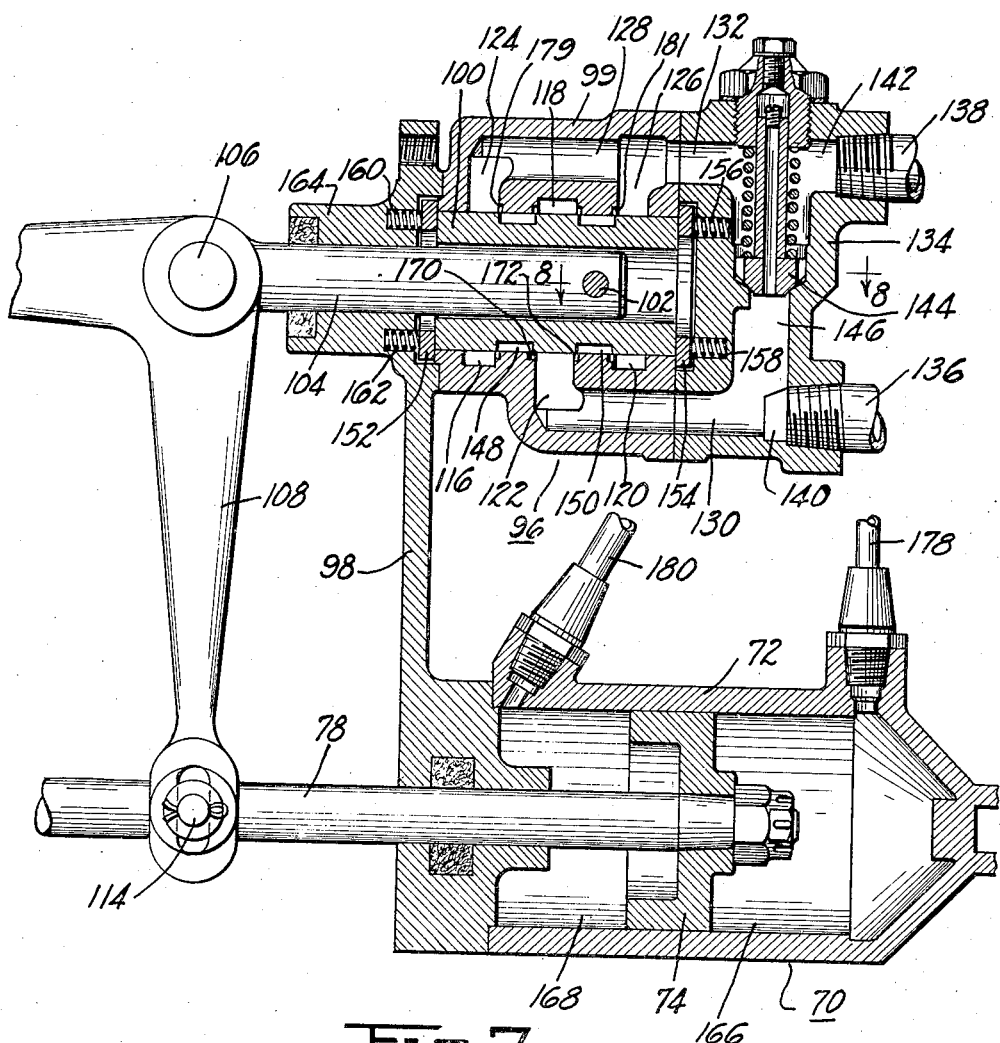

Patented Jan. 19, 1943

2,308,846

UNITED STATES PATENT OFFICE 2,308,846

STEERING MECHANISM

John William White, Van Nuys, Calif., assignor to Bendix Aviation Corporation, South Bend, Ind., a corporation of Delaware Application September 11, 1940, Serial No. 356,259

10 Claims. (Cl. 244—50)

This invention relates to aircraft landing gear and more particularly to a retractible nose wheel which is swiveled to steer the plane on the ground.

Numerous types of mechanism for retracting nose wheels have been used on aircraft, and many of these mechanisms have been complicated, expensive or occupy relatively large amounts of space in their retracted positions. It follows that to combine with such a nose wheel operating mechanism means for steering the wheel would call for a very complicated mechanism. Accordingly, an object of my invention is to provide a relatively simple, inexpensive and compact nose wheel and retracting mechanism therefor in combination with means for steering the wheel.

One of the principal objects of my invention, however, is to provide irreversible means for steering a retractible nose wheel of an airplane, the mechanism being so constructed and arranged as to effect a turning movement of the wheel as the same is being retracted into a compartment in the fuselage. Such a movement results in the positioning of the wheel within said compartment in a plane parallel or substantially parallel to the plane of the ground, thereby requiring only a relatively small compartment to house the wheel.

Another object of the invention is to provide a simple and rugged mounting for such a wheel, which mounting facilitates either the swiveling or the retraction of the wheel and includes an oleo gear type of shock absorber assembly which acts both as a part of the wheel mounting and as a means to absorb part of the shock of landing.

Yet another object of the invention is to provide power means for actuating a steerable nose wheel of an airplane, said power means being controlled by a follow-up mechanism insuring that the extent of movement of a manually operated control member will be substantially proportional to the extent of movement of the power element of the power means and the nose wheel connected thereto.

Yet another important object of the invention is to provide means for preventing an undesirable angular movement or shimmy of a swiveled nose wheel of an airplane.

Another object of the invention is to provide hydraulic means for steering a nose wheel of an airplane, said means also serving to prevent the wheel from shimmying as the airplane is being landed or taxied.

Yet another object of the invention is to provide means, preferably hydraulic means, serving both to steer a nose wheel suspended from an oleo gear type of shock absorber and to dampen the angular movement or so-called shimmy of said wheel.

Another object of the invention is to provide a centering and damping device which will prevent shimmy of the nose wheel of an airplane and will keep said wheel centered in a fore and aft plane at all times when the load is removed: and a further object of the invention is to provide an irreversible steering mechanism for the nose wheel of an airplane. To these ends the invention is preferably embodied in a hydraulic motor or ram controlled by a follow-up valve, said valve being operated both by a manually operated control member, preferably the rudder bar of the airplane, and by the power element of the motor.

Other objects of the invention and desirable details of construction and combinations of parts will become apparent from the following description of a preferred embodiment, which description is taken in conjunction with the accompanying drawings, in which:

Figure 3 is a plan view of the greater portion of the mechanism disclosed in Figure 2;

Figure 7 is a sectional view disclosing in detail the hydraulic motor and control valve of the power steering mechanism of my invention; and Figure 8 is a sectional view of the valve unit of my invention, said section being taken on the line 8—8 of Figure 7.

Figure 1:
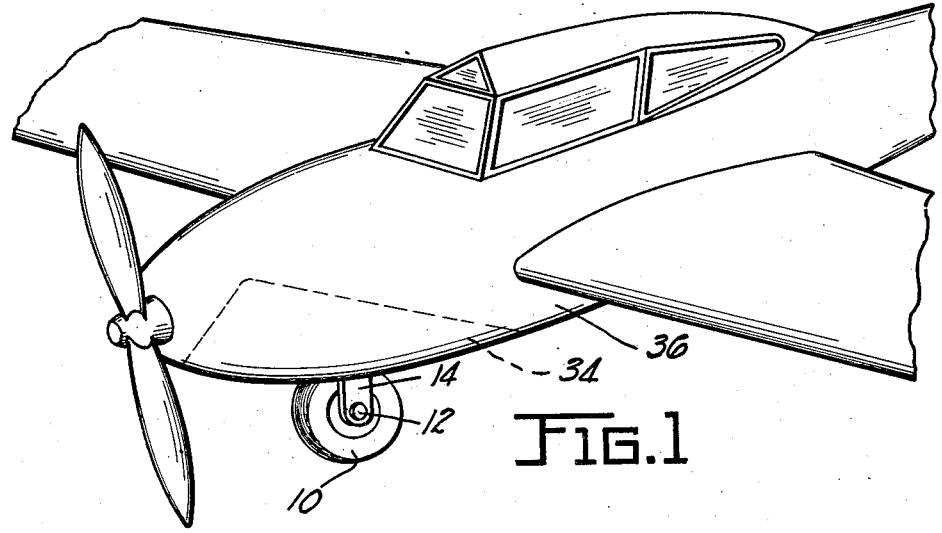
Figure 1 is a view disclosing the forward portion of an airplane equipped with the nose wheel steering and retracting mechanism constituting my invention.

Referring to Figures 1 to 6 inclusive of the drawings, there is disclosed an airplane nose wheel 10 rotatably mounted upon an axle 12 which is journalled in the ends of a bearing member 14. A rotatable shaft member 16 extending from the upper end of the member 14 constitutes one element of a so-called oleo gear type of shock absorber assembly and said shaft telescopes within a hollow stationary shaft member 13 of said assembly. The latter shaft houses the piston and other mechanism of the shock absorber assembly. Following standard practice the diameter of the nose wheel should be approximately two-thirds that of the main wheels of the airplane, thereby insuring a relatively large rolling radius for steering on soft rutted ground. Furthermore, the spindle axis of the wheel, that is the axis of the shock strut members 16 and 18, should be inclined forwardly, say approximately 12°. The hollow stationary shaft member 18 is of course closed at its top and the rate of movement of member 16, as the same slides into the member 18, is determined by the mechanism within the shaft 18 including the aforementioned piston and of course the fluid and valve mechanism for controlling the flow of said fluid. To the top of member 18 there is fixedly secured a split boss or collar member 20 and to said latter member there is pivotally secured a collapsible X-shaped strut member 22 hinged at 24. The ends 26 and 28 of said X member are pivotally connected respectively to shafts 30 and 31, the ends of which are mounted in the side walls of a nose wheel receiving well or compartment 34 in the fuselage 36 of the airplane. As disclosed in Figures 2 and 3 strut members 38 and 40 are pivotally connected at their upper ends to the lower end of the stationary oleo shock strut member 18 and at their lower ends said members are pivotally mounted upon a shaft 42 which extends across the compartment 34 and is mounted at its ends in the side walls of said compartment.

Completing the description of the strut mounting for the nose wheel there are provided struts 44 and 46 pivotally connected at their upper ends to the split boss 20 and at their lower ends pivotally mounted upon the shaft 42. The pivotal mounting of the struts 38, 40, 44 and 46 upon the shaft 42 preferably includes anti-friction bearings, not shown. A hydraulic motor 48, comprising a double-ended hollow tubular shaped casing member 50 and a piston 52, serves, when energized, to move the nose wheel to its retracted position disclosed in Figure 4. The casing member 50 is pivotally connected to the support member 30 at 54 and a connecting rod 56 is connected, by struts 58, 60, 62 and 64 to the aforementioned struts 38, 40, 44 and 46. To energize the motor 48, oil or other power fluid such as air is admitted to a compartment 66 of the motor via a conduit 68.

Describing now the power means for steering the nose wheel, and incidentally preventing the same from shimmying, a double-ended double-acting motor 70 comprising a casing 72 and a piston 74 is pivotally secured to a bracket 76 fixedly secured to the fuselage within the compartment 34. A connecting rod 78 fixedly secured at one of its ends to the piston 74 extends through one end of the motor casing 72 and is pivotally connected at its other end to a crank 80 pivotally mounted upon the shaft 42. To the upper end of the crank 80 there is pivotally connected one end of a drag link 82 and said link is pivotally connected at its other end to a horizontally extending crank 84 on the swivel bearing, said crank extending from a collar 86 rotatably mounted on the strut member 18. Torque arms 88 and 90 of the oleo shock strut are connected to the collar 86 and flanges 92 and 94, fixedly secured to the strut 18, prevent the collar 86 from sliding up and down said strut.

Referring now to Figure 7 disclosing the details of the motor 70 and its control valve 96 the latter includes a three-part cylindrically shaped casing secured to a flange 98 extending from the casing of the motor 70. The interior of the central portion 99 of the valve 96 receives a tubular shaped valve member 100, said member being secured, by a pin 102, to a rod 104. This rod is pivotally connected at one of its ends 106, to a valve operating bell crank lever 108 and said lever is pivotally connected at 110 to one end of a link 112 connected to linkage extending to a foot operated member mounted adjacent the pilot's seat in the cockpit of the plane. The other end of the bell crank lever is pivotally connected at 114 to the piston operated connecting rod 78.

The central portion 99 of the valve casing is provided with three annularly extending rectangular shaped recesses 116, 118 and 120. An angular shaped duct 122 is connected with the recess 118 and ducts 124 and 126 extend respectively from recesses 116 and 120 and are connected with a duct 128. The ducts 122 and 128 are connected respectively with ducts 130 and 132 within a portion 134 of the three-part valve casing member. As disclosed in Figure 7 conduits 136 and 138 are connected respectively with an intake port 140 and a return port 142 in the valve casing member 134, said conduits leading respectively to an engine operated accumulator, not shown, or other convenient source of fluid pressure and to the accumulator pump.

Completing the description of the valve mechanism, a spring-loaded safety valve 144 is incorporated in a duct 146 interconnecting the ducts 130 and 132, and the movable valve member 100 is provided with two spaced annular recesses 148 and 150 which are rectangular in outline. The valve member 100 is biased to its valve closed position by ring members 152 and 154, the position of said valve member within the valve casing being determined by springs 156, 158, 160 and 162 housed within recesses in the valve casing member 134 and a valve casing member 164, all as disclosed in Figure 7.

When the valve member 100 is in its valve closed position within the valve member, that is the position disclosed in Figures 7 and 8, the power fluid from the intake conduit 136, which fluid is at the time under pressure from the accumulator, is admitted to compartments 166 and 168 of the motor 70 via duct 122, recesses or undercut portions 170 and 172 of the casing member 99, the aforementioned recesses 148 and 150 of the valve member 100, ports 174 and 176 in said casing member and conduits 178 and 180 leading respectively to said compartments. However, no motion is imparted to the motor piston 74 inasmuch as the fluid in both compartments 166 and 168 is under the same pressure and the area of the piston exposed to said fluid is the same on both sides of the piston. The motor compartments 166 and 168 are also at the time connected to the intake side of the accumulator pump via conduits 178 and 180, ports 174 and 176, recesses 148 and 150, undercut portions 179 and 181, and ducts 124, 126, 128 and 132.

Figure 6:
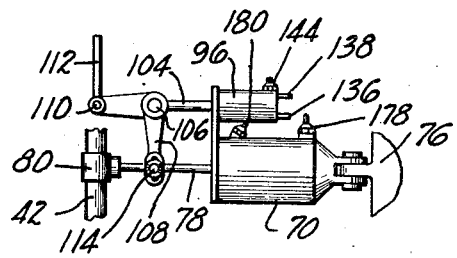
Figure 6 is a view disclosing in plan the power steering motor unit and control valve therefor.
Figure 5:
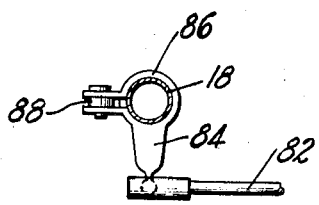
Figure 5 is a sectional view taken on the line 5—5 of Figure 2 disclosing a portion of the nose wheel steering mechanism.

Describing now the operation of the combined steering and retracting mechanism constituting my invention should the pilot wish to steer the plane to the right the foot operated member, for example a whiffle tree located in the lockpit of the airplane, is moved to place the link 112, Figure 6, in tension. The bell crank lever 108 is thus rotated clockwise about the pivot 114 as a fulcrum resulting in a movement of the valve member 100 to the right, Figure 7. This relative movement of the valve member 100 and the inner portion of the valve casing member 99 constituting a valve member, results in further compressing the springs 156 and 158 and in cutting off the fluid transmitting connection between the recess 118 and the recess 150 connected to the motor compartment 166. This relative movement of the valve members 99 and 100 also results in maintaining the fluid transmitting connection between the compartment 168 of the motor 70 and the duct 122 leading to the intake conduit 136 connected to the accumulator. Describing this connection, the same includes the conduit 180, port 174 in the valve member 99, recess 148 in valve member 100, recess 118 in valve member 99, ducts 122 and 130 and the conduit 136.

The motor 70 is thus energized inasmuch as the piston 74 is then subjected to a differential of fluid pressures, the fluid from the accumulator, preferably oil, acting on the left side of the piston and subjecting this side of the piston to a pressure greater than the pressure exerted by the fluid within the compartment 166 of the motor, the latter fluid being at the time connected to the return conduit 138 which is connected to the intake port of the accumulator pump. The piston 74 is thus moved to the right, Figure 7, to rotate the crank 80 counterclockwise and place the drag link 82 under compression. The crank 84 is thus rotated clockwise and the nose wheel 10, connected to the crank 84 by the member 14, torque arms 88 and 90 and collar 86, is turned to the right to steer the airplane to the right.

Describing now an important feature of my invention, should the pilot of the airplane stop the movement of the foot-operated whiffle tree before the nose wheel has been moved to its extreme right turn position, then movement of the wheel stops shortly thereafter; for when the link 112 stops moving, the piston 74 continues to move so long as the valve remains open. This operation is known in the art as a follow-up action of the valve and briefly describing this action, when the movement of the link 112 is stopped the valve members 99 and 100 are then in the relative positions described above, that is the valve is open. The piston 74 and the parts connected thereto then continue to move; however, the fulcrum of the bell crank lever 108 changes from the pivot 114 to the pivot 110. The pivotal mounting of the motor 70 and valve unit at 76 and the construction of the pivots 106, 110 and 114 make possible the opening and closing operations of the valve. The shifting of the fulcrum of the bell crank lever 108 results in a movement of valve member 100 to the left, Figure 7, thereby closing the valve mechanism, that is returning the parts of the same to the position disclosed in Figure 7. The motor piston 74 is then no longer subject to a differential of pressures for the system is in equilibrium. This operation is defined as a follow-up control for the piston 74 and the nose wheel steering crank 84 connected thereto follow the movement of the manually operated whiffle tree or other nose wheel steering control member, each increment of movement of the control member resulting in a corresponding and proportional increment of turning movement of the nose wheel.

To steer the airplane to the left as the same is moving over the ground, the pilot moves the foot-operated control member as to place the link 112 in compression. The bell crank lever 108 is then rotated counterclockwise about the pivot 114, thereby moving the valve member 100 to the left, Figure 7, to open the valve. The operation of the valve mechanism and motor resulting from this movement of the valve member 100 is made evident from an inspection of Figures 7 and 8 of the drawings and the description of the operation of the valve given above; and this operation of the mechanism may be described as being just the reverse of the previously described operation. The motor 70 is thus again energized to rotate the crank 80 counterclockwise, the motor compartment 168 being connected to the intake side of the pump and disconnected from the accumulator and the motor compartment 166 being connected to the accumulator and disconnected from the intake side of the pump. The nose wheel is thus rotated counterclockwise about the oleo shock strut 18 as a spindle, thereby effecting a leftward turning movement of the plane. It will also be evident that the motor and valve unit may again be operated to effect a follow-up control when a left turn of the plane is being effected, such operation being similar to the operation of these parts when the airplane is turned to the right.

Discussing now an important feature of the power steering mechanism of my invention the same constitutes means for preventing an undesirable angular movement or shimmy of the nose wheel, for the nose wheel of an airplane is inherently unstable at low taxiing speeds. If adequate damping is not provided violent shimmy can be produced with any arrangement of swivel axis and trail, and with any wheel load within the range likely to be used in practice. Normal turf conditions do not under normal conditions of service, prevent shimmy of the nose wheel, nor do they appreciably change its period or maximum amplitude. Furthermore, the rapidity with which the amplitude increases indicates that the motion in shimmy is highly unstable.

The motor and valve unit of my invention serve to prevent this undesirable shimmy, for assuming the manually operated steering member in the cockpit to be in its off position, that is its position to effect a straight-ahead position of the nose wheel, then any tendency of said wheel to shimmy is counteracted by the fluid in the power steering system and by the valve springs 156, 158, 160 and 162. Movement of the motor piston 74 in either direction will effect a movement of the power fluid; however, said movement will be very slight for several reasons including the resistance encountered by the power fluid passing through the relatively small undercut openings 170, 172, 179 and 181. In any event the movement of the piston 74 is insufficient to open the valve.

Figure 4:
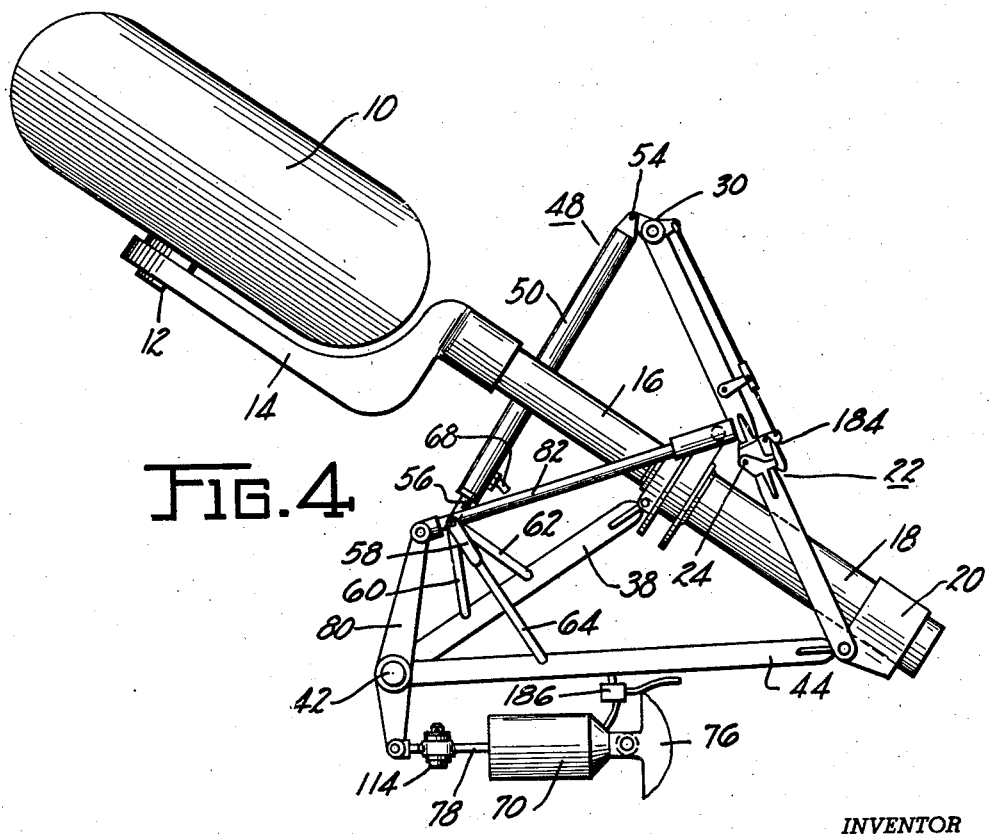
Figure 4 is a view disclosing the nose wheel in its retracted position.
Figure 2:
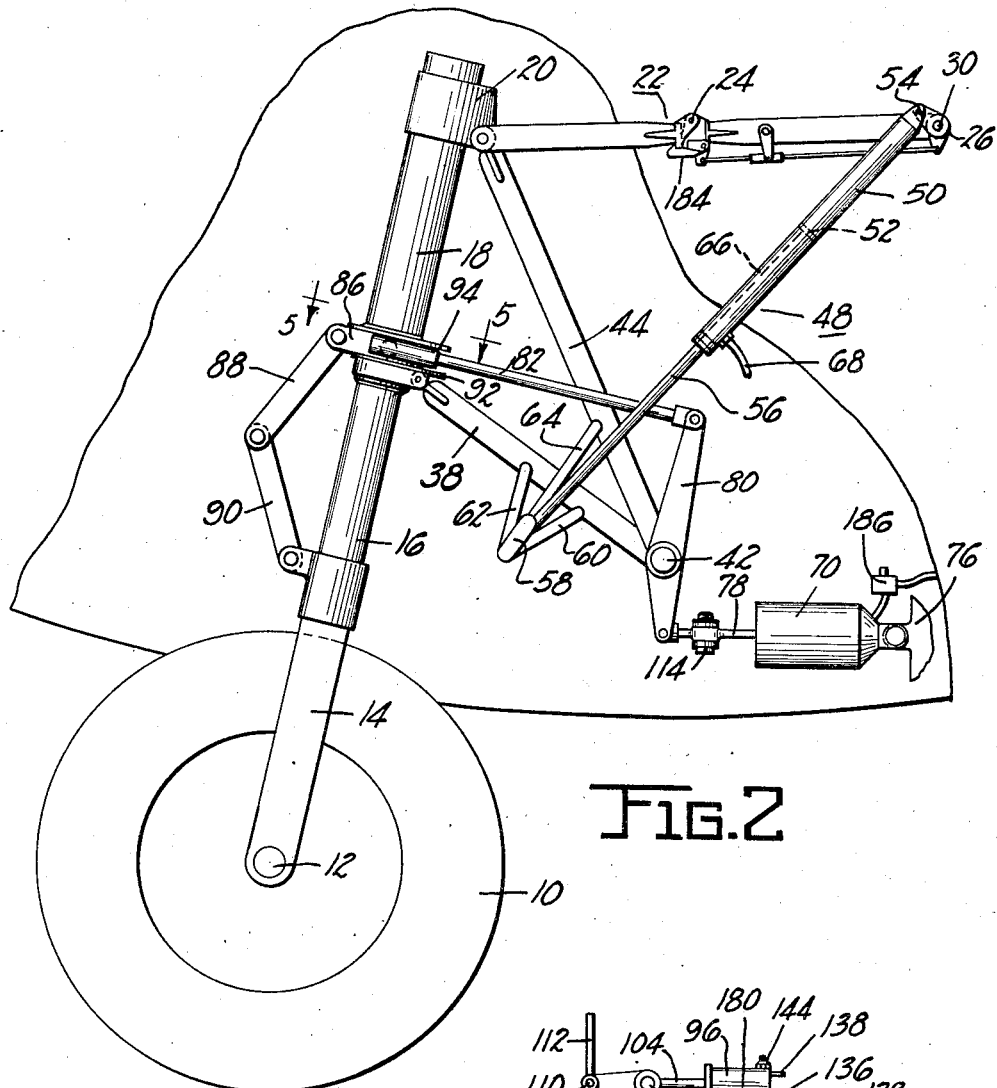
Figure 2 is a side elevational view of the nose wheel steering and retracting mechanism constituting my invention.

Describing now the most important feature of my invention, when the nose wheel is retracted into the fuselage compartment 34 by means of the hydraulic motor 48, said wheel is rotated approximately 90° to the position disclosed in Figure 4. By virtue of this position of the wheel the compartment 34 may be made smaller. This turning of the wheel is made possible by virtue of the construction and arrangement of the several parts of the mechanism, particularly the crank 84 and the horizontally extending drag link 82 pivotally connected to the vertically extending crank 80. The nose wheel and shock strut assembly are rotatable as a unit about an axis substantially normal to the shock movements of the shock absorber, that is, the axis of the shaft 42. Described in other words, the landing gear, that is the mechanism including the nose wheel and the shock absorber assembly, is bodily rotatable about a centrally located pivot bearing, that is the shaft 42 mounted in the fuselage. The crank 80 of the power steering mechanism is rotatably mounted on said shaft and extends upwardly, that is perpendicular to the ground; accordingly, the drag link 82 remains at all times parallel or substantially parallel to the ground. When the motor 48 is energized to retract the nose wheel into the well 34 the crank 80 remains stationary due to the immobility of the fluid within the motor 70 and the drag link 82 connected to the cranks 80 and 84 effects the aforementioned 90° rotation of the wheel and the movable element 16 of the oleo gear as the wheel and its mounting moves to the retracted position disclosed in Figure 4. The X-shaped strut member 22 collapses during this operation and is locked in the position disclosed in Figure 4 by a locking mechanism 184, constituting no part of my invention.

When the pilot desires to return the nose wheel to its operative position in Figure 1 the mechanism 184 is unlocked and the force of gravity then moves the mechanism to said position. As disclosed in Figure 4 cut-off valve 186, incorporated in the conduit 136, is operated by the strut 44 to cut off the fluid transmitting connection between the accumulator and the motor 70 when the nose wheel is in its retracted position; accordingly, the nose wheel may not be turned by the power steering means when the wheel is in this position. The cut-off valve 186 may also be operated by manually operated means, not shown, to at any time disable the power steering means at the will of the pilot; or adjustable stops may be positioned adjacent the whiffle tree or prevent a movement of the same.

There is thus provided a simple and inexpensive retractible landing gear mechanism for an airplane, said mechanism including power means for effecting a rotation of the nose wheel to steer the airplane and the parts being so constructed and arranged as to make possible a retraction of the nose wheel within a small compartment in the fuselage.

While one illustrative embodiment has been described in detail, it is not my intention to limit the scope of the invention to that particular embodiment, or otherwise than by the terms of the appended claims.

I claim:

1. In an airplane provided with a fuselage having a well portion shaped to receive a retractible landing gear mechanism, a shaft supported in the side walls of said well portion and extending crosswise thereof, a retractible landing gear including in combination a shock absorber assembly mounted for rotation as a whole about said shaft, said assembly being movable as a unit into the well portion within the fuselage, a landing wheel secured to the shock absorber assembly the two moving as a unit, a steering crank secured to a rotatable portion of said assembly, and power steering means for moving said crank to steer the landing wheel, said power steering means including a hydraulic motor and a follow-up-to-lap type of control valve for said motor and linkage interconnecting the power element of said motor with said crank, said linkage including a drag link and a crank pivotally mounted on the aforementioned shaft, the drag link being so positioned with respect to the first mentioned crank and so mounted as to effect, when the second mentioned crank is stationary by virtue of the power means being inoperative, a rotation of the latter crank when the shock absorber assembly is retracted into the well.

2. In an airplane provided with a fuselage having a well for housing a nose wheel landing gear assembly, a shaft extending crosswise of the airplane within said well and mounted at its ends in the side walls of the well, a retractible landing gear assembly including in combination a shock absorber assembly mounted for rotation as a whole about said shaft, said assembly being movable as a unit into the well portion within the fuselage, a landing wheel secured to the shock absorber assembly the two moving as a unit, a steering crank secured to a rotatable portion of said assembly, and power steering means for moving said crank including a hydraulic motor, a valve for controlling the operation of said motor and linkage interconnecting the power element of said motor with said crank, said linkage including a crank pivotally mounted on the aforementioned shaft and further including a drag link interconnecting the two cranks and operable, when the second mentioned crank is stationary by virtue of the power means being inoperative, to effect a rotation of the first mentioned crank when the shock absorber assembly is retracted into the well.

3. In an airplane provided with a nose wheel and a fuselage having a nose wheel receiving compartment therein, mechanism for retracting and steering said nose wheel and for preventing said wheel from shimmying, said mechanism including in combination a bearing member for supporting said wheel, a shock absorber assembly secured to said bearing member, a steering crank secured to a rotatable portion of said assembly, a plurality of shafts supported in the side walls of said compartment and extending crosswise thereof, a plurality of struts interconnecting said shafts and shock absorber assembly and serving as a mounting for said assembly and nose wheel connected thereto, means for bodily moving said nose wheel and shock absorber assembly to thereby move the nose wheel into the aforementioned compartment, and power means for steering said nose wheel and for preventing oscillatory movement of the wheel when the same is not being steered, said means including a hydraulic motor and manually operated valve means for controlling the operation of said motor, and force transmitting linkage interconnecting the power element of the motor and the aforementioned crank, said linkage including a crank pivotally mounted on one of said shafts and further including a drag link pivotally connected to both of said cranks.

4. In an airplane provided with a nose wheel and a fuselage having a nose wheel receiving compartment therein, mechanism for retracting and steering said nose wheel and for preventing said wheel from shimmying, said mechanism including in combination a bearing member for supporting said wheel, a shock absorber assembly secured to said bearing member, said assembly including torque arms, a crank secured to a rotatable portion of said assembly, a plurality of shafts supported in the side walls of said compartment and extending crosswise thereof, a plurality of struts interconnecting said shafts and shock absorber assembly and serving as a mounting for said assembly and the nose wheel connected thereto, means for bodily moving said nose wheel and shock absorber assembly to thereby move the nose wheel into the aforementioned compartment, and power means for steering said nose wheel, said means including a motor, a follow-up valve mechanism for controlling the operation of said motor and force transmitting means interconnecting the power element of the motor and the torque arms of said shock assorber assembly, said means including a crank mounted on one of said shafts and extending normal or substantially normal to the ground and further including a drag link pivotally connected to said latter crank and to the aforementioned crank.

5. In an airplane a retractible landing gear including in combination a shock absorber assembly mounted to be bodily moved as a unit about an axis extending crosswise of the airplane and parallel or substantially parallel to the ground, said assembly including a fixed housing member and a rotatable member which may be telescoped within said fixed member, a nose wheel connected to said rotatable member, means for effecting the aforementioned bodily movement to thereby retract the nose wheel, a crank mounted upon the fixed housing member, a supporting shaft extending crosswise of the airplane, a crank rotatably mounted on said shaft, a drag link interconnecting one end of the latter crank and the end of the aforementioned crank, and means for rotating the crank mounted on the shaft to thereby rotate the nose wheel and steer the airplane as the same is being taxied along the ground, said means also serving to prevent angular movement of the first mentioned crank as the nose wheel is being retracted.

6. In an airplane provided with a fuselage having a nose wheel receiving compartment in the forward part of said fuselage, a landing gear comprising a plurality of shafts extending crosswise of the compartment and mounted in the side walls thereof, a shock absorber assembly including a rotatable member, a crank secured to said rotatable member, a nose wheel mounted on one end of said rotatable member, a plurality of struts so constructed and so connected to said shafts and shock absorber assembly as to make possible a retraction of the nose wheel into said compartment, means for effecting said retraction including a motor, and power means for rotating the nose wheel to steer the airplane, said power means including a motor and a crank mounted on one of the aforementioned shafts, force transmitting means interconnecting the power element of the motor and the latter crank, and other force transmitting means interconnecting the latter crank with the first mentioned crank the parts of said mechanism being so constructed and arranged as to effect a turning of said nose wheel when the same is retracted, said turning being effected by the second mentioned force transmitting means.

7. A retractible landing gear mechanism for an airplane provided with a compartment in its fuselage, said compartment serving to house said landing gear mechanism, said mechanism including a bodily movable shock strut assembly, movable strut members secured to said assembly and a nose wheel mounted on a rotatable portion of said assembly, means for bodily moving said assembly and wheel as a unit to move the wheel into said compartment, and means for steering said nose wheel and preventing said wheel from shimmying and for effecting a rotation of said wheel as the same is being retracted into said compartment, said means including a crank secured to the rotatable portion of said shock strut assembly, a crank extending normal to, or substantially normal to the ground and further including a drag link extending horizontally and interconnecting said cranks.

8. In an airplane provided with a fuselage having a nose wheel receiving compartment, a plurality of shafts extending crosswise of said compartment, one of said shafts having both of its ends fixedly secured in the side walls thereof, a landing gear assembly which may be retracted into said compartment, said assembly including a shock absorber assembly comprising a rotatable member, a nose wheel secured to said rotatable member and a plurality of struts interconnecting the aforementioned shafts and shock absorber assembly, power means including a double-acting hydraulic motor and a manually and power operated follow-up valve mechanism for controlling the operation of said motor, and means connecting the power element of said motor with the aforementioned rotatable member of the shock absorber assembly, said means including a crank pivotally mounted on the aforementioned shaft which has both of its ends secured in the side walls of the nose wheel receiving compartment, a drag link interconnecting said crank with the rotatable member and a link interconnecting said crank with the power element of said hydraulic motor.

9. A retractible landing gear mechanism for an airplane provided with a compartment in its fuselage, said compartment serving to house said landing gear mechanism, said mechanism including a bodily movable shock strut assembly, movable strut members secured to said assembly and a nose wheel mounted on a rotatable portion of said assembly, means for bodily moving said assembly and wheel as a unit to move the wheel into said compartment, and means for steering said nose wheel and preventing said wheel from shimmying and for effecting a rotation of said wheel as the same is being retracted into said compartment.

10. A retractible landing gear mechanism for an airplane provided with a compartment in its fuselage, said compartment serving to house said landing gear mechanism, said mechanism including a bodily movable shock strut assembly, movable strut members secured to said assembly and a nose wheel mounted on a rotatable portion of said assembly, a crank member secured to the rotatable portion of said assembly, means for bodily moving said assembly and wheel as a unit to move the wheel into said compartment, and means for steering said nose wheel and preventing said wheel from shimmying and for effecting a rotation of said wheel as the same is being retracted into said compartment, said means including a double-acting hydraulic motor, valve means for controlling the steering operation of said motor, force transmitting means interconnecting the power element of said motor with the aforementioned crank, said means being held stationary, by the then stationary power fluid within the motor, when the landing gear mechanism is being retracted into the aforementioned compartment whereby the crank is rotated to turn the nose wheel and a cut-off valve connected to one of the strut members and operable, when the landing gear is housed within the aforementioned compartment, to render the hydraulic motor inoperative as a means for steering the nose wheel.

JOHN WILLIAM WHITE.